US012798066B2

(12) United States Patent
Craig Paterson

(10) Patent No.: US 12,798,066 B2
(45) **Date of Patent: *Nov. 17, 2026**

(54) ACTUATION SYSTEM

(71) Applicant: Globalforce IP Limited, Ponsonby (NZ)

(72) Inventor: Ian Craig Paterson, Ponsonby (NZ)

(73) Assignee: Globalforce IP Limited, Ponsonby (NZ)

( * ) Notice: Subject to any disclaimer, the term of this patent is extended or adjusted under 35 U.S.C. 154(b) by 0 days.

This patent is subject to a terminal disclaimer.

(21) Appl. No.: 17/791,348

(22) PCT Filed: Jan. 7, 2021

(86) PCT No.: PCT/NZ2021/050002
§ 371 (c)(1),
(2) Date: Jul. 7, 2022

(87) PCT Pub. No.: WO2021/141503
PCT Pub. Date: Jul. 15, 2021

(65) Prior Publication Data

US 2023/0347487 A1 Nov. 2, 2023

Related U.S. Application Data

(60) Provisional application No. 62/958,292, filed on Jan. 7, 2020.

(30) Foreign Application Priority Data

Mar. 6, 2020 (NZ) ........................................ 762428

(51) Int. Cl.
*B25C 1/04* (2006.01)

(52) U.S. Cl.
CPC .................................... *B25C 1/047* (2013.01)

(58) Field of Classification Search
USPC .......... 227/1–2, 8–19, 51, 63–64, 77–82, 99, 227/107, 140, 156
See application file for complete search history.

(56) References Cited

U.S. PATENT DOCUMENTS 2,960,067 A * 11/1960 Osborne ................. B25C 1/041 91/461
3,055,344 A * 9/1962 Fisher ...................... B25C 1/047 227/123

(Continued)

FOREIGN PATENT DOCUMENTS

CA 2190228 A1 * 5/1997
JP 2004001135 A * 1/2004 ............. B25C 1/047

OTHER PUBLICATIONS

International Search Report, issued in International Application No. PCT/NZ2021/050002 by International Bureau on May 10, 2021.

(Continued)

*Primary Examiner* — Robert F Long
(74) *Attorney, Agent, or Firm* — Lowe Graham Jones PLLC; Ellen M. Bierman

(57) ABSTRACT

Disclosed is a device and method to operate on and control a high pressure fluid. The device has a dump chamber to receive high pressure fluid from a high pressure fluid source, and a dose chamber, to receive a flow of the high pressure fluid from the dump chamber via a flow path from the dump chamber to the dose chamber, having an outlet. Present also is a working chamber having an inlet end at an end thereof, and a dose valve member with an annular sealing surface surrounding the inlet end. When the dose valve member in a closed condition the sealing surface meets with an annular seat to seal the outlet; and with the dose valve member in an open condition a gap is presented between the annular sealing surface and the seat to allow high pressure fluid to move from the outlet to the inlet. The high pressure fluid in (Continued)

the dump chamber, at least in part, holds the dose valve member in the closed condition, until the high pressure fluid pressure in the dump chamber is reduced, whereby the high pressure fluid in the dose chamber unseats the dose valve member to the open position.

20 Claims, 12 Drawing Sheets

(56) References Cited

U.S. PATENT DOCUMENTS 3,088,440 A 5/1963 Wilmer
3,850,359 A * 11/1974 Obergfell .................. B25C 1/08 60/632
4,039,113 A 8/1977 Males
4,194,644 A 3/1980 Narvaez
4,194,664 A * 3/1980 Siegmann ............... B25C 1/043 91/461
4,253,598 A * 3/1981 Haytayan ................ B25C 1/047 227/119
4,384,668 A * 5/1983 Tutomu .................. B25C 1/041 227/8
4,549,344 A * 10/1985 Nikolich ................. B25C 1/041 29/432
4,566,619 A * 1/1986 Kleinholz ............... B25C 1/044 227/118
5,829,660 A * 11/1998 White ..................... B25C 1/041 227/8
7,296,721 B1 * 11/2007 Wen ........................ B25C 1/045 227/8
8,215,529 B2 * 7/2012 Wu ........................... B25C 1/04 173/9
8,931,178 B2 * 1/2015 Beam .................. B26B 19/3813 30/210
2004/0026477 A1 * 2/2004 Ishizawa ................ B25C 1/047 227/130
2005/0200087 A1 * 9/2005 Vasudeva .................. B25F 3/00 279/143
2009/0165600 A1 * 7/2009 Kolodziej ............... B25B 21/00 81/436
2011/0108600 A1 * 5/2011 Pedicini .................. B25C 1/047 227/2
2013/0082085 A1 * 4/2013 Largo ........................ B25C 7/00 227/130
2014/0158740 A1 * 6/2014 Akutsu ..................... B25C 1/04 227/130
2015/0102084 A1 * 4/2015 Zhao ......................... B25C 1/08 227/140
2015/0184689 A1 * 7/2015 Godfrey ................... B21J 15/38 29/515
2017/0066115 A1 * 3/2017 Hale ......................... B25C 1/02
2023/0065490 A1 * 3/2023 Paterson ................. B25C 1/042

OTHER PUBLICATIONS

International Preliminary Report on Patentability, issued in International Application No. PCT/NZ2021/050002 by International Bureau on Apr. 8, 2022.

* cited by examiner

ACTUATION SYSTEM

TECHNICAL FIELD OF THE INVENTION

The present invention relates to actuation systems for high-pressure fluid powered devices.

In particular, though not solely, the present invention is directed to valves and methods of actuating them to release or impart energy.

BACKGROUND OF THE INVENTION

There is a need to control and release energy, and in particular energy that is transmitted, provided, or released by high-pressure fluids.

In one example high pressure fluids, such as compressed gas, for example air, or carbon dioxide, can be used to do work. In one such example compressed air may be valved to drive a piston or similar in a work chamber to do work, such as drive a fastener, for example in tools such as, but not limited to a nail gun.

In such a case energy is extracted from a high pressure fluid source via expansion. Expansion of a gas is always related to a reduction in pressure unless heating, or additional work (compression) is done on the system, or additional gas is added.

There exist air powered nail guns, typically attached by a tether to a pneumatic compressor, that use gas under pressure in order to drive a reciprocating piston, which piston in turn drives a nail or fastener in to the material(s) to be fastened. In these compressor supplied systems, air is continuously supplied, via a valve, to keep pressure behind the piston sufficiently high to perform the desired drive function. The valve, or another valve then allowing the piston to return to a ready to work position.

Keeping intake gasses cold is important to retain high efficiency use of the compressed gas, which is difficult or impossible after numerous combustion cycles. This is important to the function of the tool, because if the pressure was not maintained at a high level, the lower pressure may not be sufficient to drive home the nail. This is of course dependent on the specific substrate, nail type, chamber volumes and piston diameter implemented in a specific design.

These tools (especially the framing variants) are inefficient in their use of compressed gas. They use a lot of air to drive each nail and return the drive piston. They are therefore unable to be run untethered from the compressor they source compressed air from for any meaningful commercial use. For this reason, efficiency is not typically a major performance metric for these tools, as the compressor just runs a bit longer at very little expense or hassle to the user. Instead, power, reliability, ruggedness, compactness, and other creature comforts are prioritized over efficiency, some of which are allowed for directly or indirectly by the presence of the effectively unlimited air supply from the tethered compressor.

In an attempt to address at least the problem of tethering, several different systems have been developed.

One such system utilises a combustible gas, such as butane, to provide an explosion that drives the tool's operation. Such combustion systems have safety issues of their own given that the tool usually includes a storage device for combustible gas and a combustion source close to each other. The gas and gas cartridges tend to be expensive and only available from select suppliers. Moreover, when finished the gas cartridges are a waste stream, and may not always be recycled. In addition, they typically need batteries for the ignition source. Again, when these fail they may not be recycled, even if they are rechargeable ones. Further, the heat and impact of the explosions tend to be hard wearing on the tool causing them to require frequent maintenance. The electrical components are susceptible to failure if the tool is exposed to moisture such as rain. All these factors add additional costs, waste stream and an element of inconvenience to the user. In addition, their performance can suffer in rapid fire situations as they must exhaust the combustion gas and intake a fresh charge of gas and air, properly mixed prior to firing. In addition, they can be inefficient in that not all the full pressure created by the combustion charge is used. Further they produce gases that can be dangerous to the health of the user, particularly in confined spaces.

More recently, portable pressure sources have been developed by which a vessel containing a pressurised fluid such as carbon dioxide may be connected via a regulator to a tool traditionally powered by an air compressor. These systems allow the tools to be used in a more portable fashion without being restricted by the hosing requirements of conventional set ups. However, the available pneumatic tools are designed for a pneumatic set up where the supply of compressed air or gas is effectively unlimited. As such, the energy transfer, and use of the compressed gas is again relatively inefficient, particularly in the drive mechanism.

Typically, such compressed gas driven tools are inefficient at least because, to simplify their manufacture and assembly, they have an architecture where one of the valves supplying compressed gas to the driven piston that does the work, performs two functions. As a result there is at least a short time where there is a flow path between the main pressurized fluid supply and atmosphere via the chamber within which the driven piston reciprocates. While the pressure areas will generally be designed to quickly stop this flow path, it may be a considerable contributor to inefficiency in some designs as effectively, even if for a short period, there is a direct path to atmospheric from the high pressure source, thus wasting the energy that is present in this high pressure fluid. In these established designs, even where this temporary leak path is minimized effectively, the mechanism still operates in a way which exhausts a large amount of full pressure gas to atmosphere, gas that has not done any work and is therefore wasted. Thermodynamically this is very inefficient.

It would therefore be an advantage for the drive mechanism of a pneumatic tool to be more efficient in the consumption of compressed gas or high pressure fluid.

One solution that avoids tethers to a remote supply of high pressure fluid, or use of combustion, or inefficient use of the high pressure fluid is that valving and actuation system disclosed in our own patent NZ 573990. This valving and actuation system can be used in many applications including impact nailers for wood, concrete and related building materials. However, that same actuation and valving system can find use in many other applications, including, but not limited to, pest control, air motors, or anywhere high efficiency valve control is desired.

In NZ 573990 the valve that unleashes the high pressure fluid into the working chamber, is cracked open by a firing hammer impacting it and opening it to allow the fluid into the working chamber to do the work. This is a very efficient system and has very little wastage of the high pressure fluid.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

It is an object of the present invention to provide an improved actuation and or valving system for high pressure fluids, or to provide improved actuation and or valving system for high pressure fluids that is more efficient and is largely or solely powered by high pressure fluid or gas, or to overcome the above shortcomings or address the above *desiderata*, or to at least provide the public with a useful choice.

BRIEF DESCRIPTION OF THE INVENTION

In a first aspect the present invention consists in a device, comprising or including,

- a dump chamber to receive high pressure fluid from a high pressure fluid source,
- a dose chamber, to receive a flow of the high pressure fluid from the dump chamber via a flow path from the dump chamber to the dose chamber, having an outlet,
- a working chamber having an inlet end at an end thereof,
- a dose valve member with an annular sealing surface surrounding the inlet end,
  - wherein with the dose valve member in a closed condition the sealing surface meets with an annular seat to seal the outlet; and with the dose valve member in an open condition a gap is presented between the annular sealing surface and the seat to allow high pressure fluid to move from the outlet to the inlet,
- wherein the high pressure fluid in the dump chamber, at least in part, holds the dose valve member in the closed condition, until the high pressure fluid pressure in the dump chamber is reduced, whereby the high pressure fluid in the dose chamber unseats the dose valve member to the open position.

Preferably when the dose valve member is open flow of high pressure fluid is prevented from entering the dose chamber or the dump chamber.

Preferably when the dose valve member is open flow of high pressure fluid is prevented from entering the dump chamber.

Preferably the high pressure fluid flowing into the working chamber then performs work on a workload therein to expel it from, or move it to or toward, an opposing end of the working chamber.

Preferably as the work load is driven from the first end (or inlet end) to the second end (or opposing end) there is no fluid connection available from any high pressure fluid source to the work load driving assembly or chambers.

Preferably the dose valve member slides linearly.

Preferably the dose valve member slides along a linear axis parallel to the major axis of the device.

Preferably the work load, whether captive, such as a piston, or expelled, such as a projectile, slides linearly along the working chamber from the inlet end, to or towards the opposing, distal end, parallel to the major axis.

Preferably the dump chamber, dose chamber, and working chamber, lie concentric with, or parallel with, the major axis.

Preferably there is an exhaust valve that is biased open, at or toward the inlet end, and which closes off an exhaust port under actuation from the high pressure fluid leaving the dose chamber.

Preferably the exhaust port opens when the work load is at or near the opposing end, under the action of the bias.

Preferably the exhaust valve is a piston or diaphragm which is at least partially encircled by the dose valve Preferably the dose valve is at least in part biased in the closed condition.

Preferably the dose chamber is a hollow volume radially outward or inward from the working chamber.

Preferably the flow path is via the dose valve.

Preferably the flow path is in a skirt of the dose valve.

Preferably there is a restriction in the flow path from the dump chamber to the dose chamber, such that the dump chamber will add to the closing pressure of the dose valve even when filling the dose chamber.

Preferably there is a one way valve in the flow path from the dump chamber to the dose chamber.

Preferably the dump chamber is an hollow cylindrical volume, such as an annular chamber.

Preferably the pressure in the dump chamber is reduced by a trigger mechanism or similar.

Preferably the trigger mechanism dumps the pressure in the dump chamber to atmosphere.

Preferably the workload is returned to the inlet end by a fluid cushion on a back side thereof, or a spring on a back side or front side, or a tensile member connected from a front side to or towards the inlet end.

Preferably the bias on the exhaust valve is a spring.

Preferably wherein, or in addition the bias on the exhaust valve is a tensile member connected between the workload and the exhaust valve.

Preferably there is a safety valve to selectively dump pressure from the dose chamber to prevent operation of the device.

Preferably there is a slow leak safety valve that releases fluid pressure from the dose chamber should the high pressure fluid supply pressure drop below that of the dose chamber.

In another aspect the present invention consists in a method of operating a high pressure fluid device, comprising or including the steps of,

- Filling a dump chamber with a high pressure fluid,
- Increasing a sealing pressure of a valve member by the high pressure fluid acting on a back side of the valve member, to hold the valve member in a closed condition, the valve member having an annular sealing surface between an outlet from a dose chamber, and an inlet to a working chamber,
- Passing high pressure fluid form the dump chamber to the dose chamber via a flow path,
- Reducing the pressure of the dump chamber such that the high pressure fluid in the dose chamber, acting on a front side of the valve member, forces the valve member to an open condition presenting a gap between the inlet and the outlet,
- The high pressure fluid then entering the working chamber from the dose chamber to perform work on a workload within the working chamber.

Preferably the dump chamber and dose chamber when filled prior to reducing the pressure are at nearly the same pressure.

Preferably an exhaust valve is moved to a position where it closes off an exhaust port from the working chamber, until the work is done on the work load, at which time the exhaust port opens, for example under a bias.

Preferably the method includes the step of allowing the work load to return to the inlet end of the working chamber, any fluid between the work load and the inlet end exiting through the exhaust port.

Preferably the exhaust port is biased open save for when the high pressure fluid exits the dose chamber such that the bias is over come and the exhaust valve moves to the closing position of the exhaust port(s).

Preferably the dose valve member moves to the closed position once the work load moves to or toward the opposing end.

Preferably a trigger mechanism reduces the pressure in the dump chamber.

Preferably the work load is returned to the inlet end by a bias, such as, but not limited to a fluid cushion/pressure bias, or compressive member on a back, non-working side of the work load, and or a tensile member on a front working side of the work load.

Preferably the dump chamber, and dose chamber are free to fill again once the dose valve member is in a closed position.

Preferably wherein, or in addition, the filling of the dump chamber aids in closing the dose valve member.

Preferably the method includes the step of optionally dumping the high pressure fluid in the dose chamber to atmosphere to prevent the device from operating.

In another aspect the present invention consists in a device as described herein with reference to any one or more of the accompanying drawings.

In another aspect the present invention consists in a method of operating a high pressure fluid device, as described herein with reference to any one or more of the accompanying drawings.

As used herein the term "and/or" means "and" or "or", or both.

As used herein "(s)" following a noun means the plural and/or singular forms of the noun.

The term "comprising" as used in this specification means "consisting at least in part of". When interpreting statements in this specification, which include that term, the features, prefaced by that term in each statement, all need to be present, but other features can also be present. Related terms such as "comprise" and "comprised" are to be interpreted in the same manner.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7).

The entire disclosures of all applications, patents and publications, cited above and below, if any, are hereby incorporated by reference.

This invention may also be said broadly to consist in the parts, elements and features referred to or indicated in the specification of the application, individually or collectively, and any or all combinations of any two or more of said parts, elements and features, and where specific integers are mentioned herein which have known equivalents in the art to which this invention relates, such known equivalents are deemed to be incorporated herein as if individually set forth.

Other aspects of the invention may become apparent from the following description, which is given by way of example only and with reference to the accompanying drawings.

BRIEF DESCRIPTION OF THE DRAWINGS

Preferred forms of the present invention will now be described with reference to the accompanying drawings in which.

DETAILED DESCRIPTION OF THE INVENTION

Figure 1:
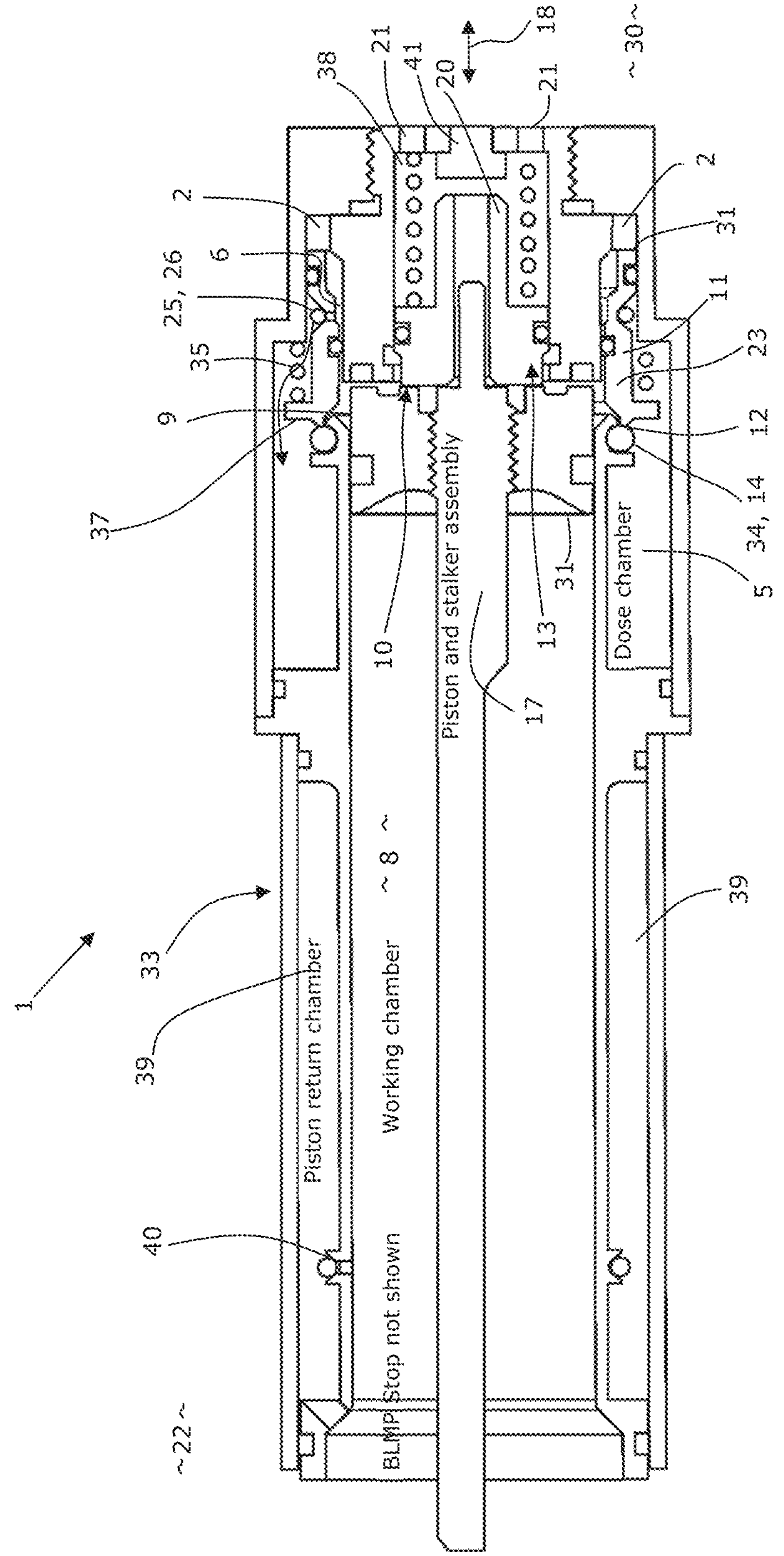
FIG. 1 Shows a vertical cross section through a device in keeping with the invention in the resting state with no high pressure fluid applied, FIG. 2 Shows a similar view to that of FIG. 1, showing the location of the pressure safety release valve and the supply and dump port to the dump chamber, FIG. 3 Shows a similar view to FIG. 1, showing the dump chamber filled and the flow from there to the dose chamber and filling that, FIG. 4 Shows the next stage from FIG. 3, where the dose chamber is now also full, FIG. 5 Shows the next stage from FIG. 4 where the dump chamber is exhausted, FIG. 6 Shows the next stage after FIG. 5 where the dose valve is now opening to allow flow from the outlet of the dose chamber to the inlet of the working chamber, FIG. 7 Shows the next stage after FIG. 6, the exhaust valve closed and the work load, in this case a piston, driven toward the opposing end of the working chamber, FIG. 8 Shows the next stage after FIG. 7, where the work load at the opposing end of the working chamber, FIG. 9 Shows the next stage after FIG. 8 where the work load, in this case the piston, is beginning its return stroke up the working chamber, and the exhaust valve is now open, FIG. 10 Shows the next stage after FIG. 9 where the work load is returned to the valving end of the work chamber, FIG. 11 Shows a similar view to FIG. 1 with the addition of a tensile member to aid in returning the piston or work load, and or to act, at least in part, as an exhaust valve, showing at A the piston at the ready to work position and the tensile member largely untensioned, B the piston moving to a position where it has done its work, the tensile member is extended between the piston and the exhaust valve and is under tension, and C the piston is on its way back up the working chamber, aided at least in part by the tensile member, and FIG. 12 Shows a schematic of several embodiments of the present invention.

Preferred embodiments will now be described with reference to FIGS. 1 through 12. The views shown are vertical cross sections along the major axis, and as such the embodiment shown and components there of are largely radially symmetrical.

A novel pneumatic force actuation valve design utilises a pressure dump triggering a force actuation valve to generate high efficiency energy extraction from a high pressure fluid, for example a compressed gas such as, but not limited to, air, or carbon dioxide. A novel pressure based piston return and exhaust flow control system to allow pressure behind the workload to vent is also proposed which integrates tightly with the force actuation valve which is useful in high cycle rate systems that also have high efficiency use of the high pressure fluid.

The components and features of the device are described with reference to FIGS. 1 through 10.

The device 1 has a supply of high pressure fluid 3 from a fluid source 4. In one preferred form the fluid source 4 is connected to, and unitary with, a tool or similar that the device 1 is part of, for example a hand held nail or fastening gun, pest trap, rescue floatation device launcher, or gas pulse cleaning system, or other assembly that requires a valving arrangement of the present invention. The high pressure fluid source 4 in this case is a pressurised container or tank holding the high pressure fluid. In other embodiments the fluid source 4 may be remotely situated and fluidly connected, for example in a valve system or similar.

The high pressure fluid 3 supplies, directly, or through a regulator, safety valve or similar, a dump chamber 2. Typically a regulator is required, which in addition to its safety aspect and any safety valves, ensures a constant operating pressure is supplied to any trigger system and the dump chamber. Typically the high pressure fluid is in a tank or container and holds the high pressure fluid at 4500 psi or higher, and regulates it down to the an operating pressure, for example of around 400 to 600 psi. The pressure in the source of high pressure fluid may of course be as high as needed, for example desired capacity when the device is an untethered one. The regulator, or a valve down stream therefrom will prevent the dump chamber being supplied with pressure which is too low to ensure correct operation of the device.

The dump chamber 2 is an annular volume as shown and this conveys several advantages. It provides a more compact system. Further, given the ring like nature of the dose valve member 11 and that it slides linearly along the major longitudinal axis of the device, then the dump chamber 2 is formed at least in part by the annular space the dose valve member 11 will slide into when fired, and out from when moving to the closed position 13. Further having the dump chamber 2 as an annular ring volume then allows for the independent exhaust valve 20 and exhaust port(s) 21 (described later) to lie within, preferably concentrically within (though it may be offset from the axis of the dose valve member 11 if necessary). This provides simplified and optimised exhaust timing and control.

Figure 3:
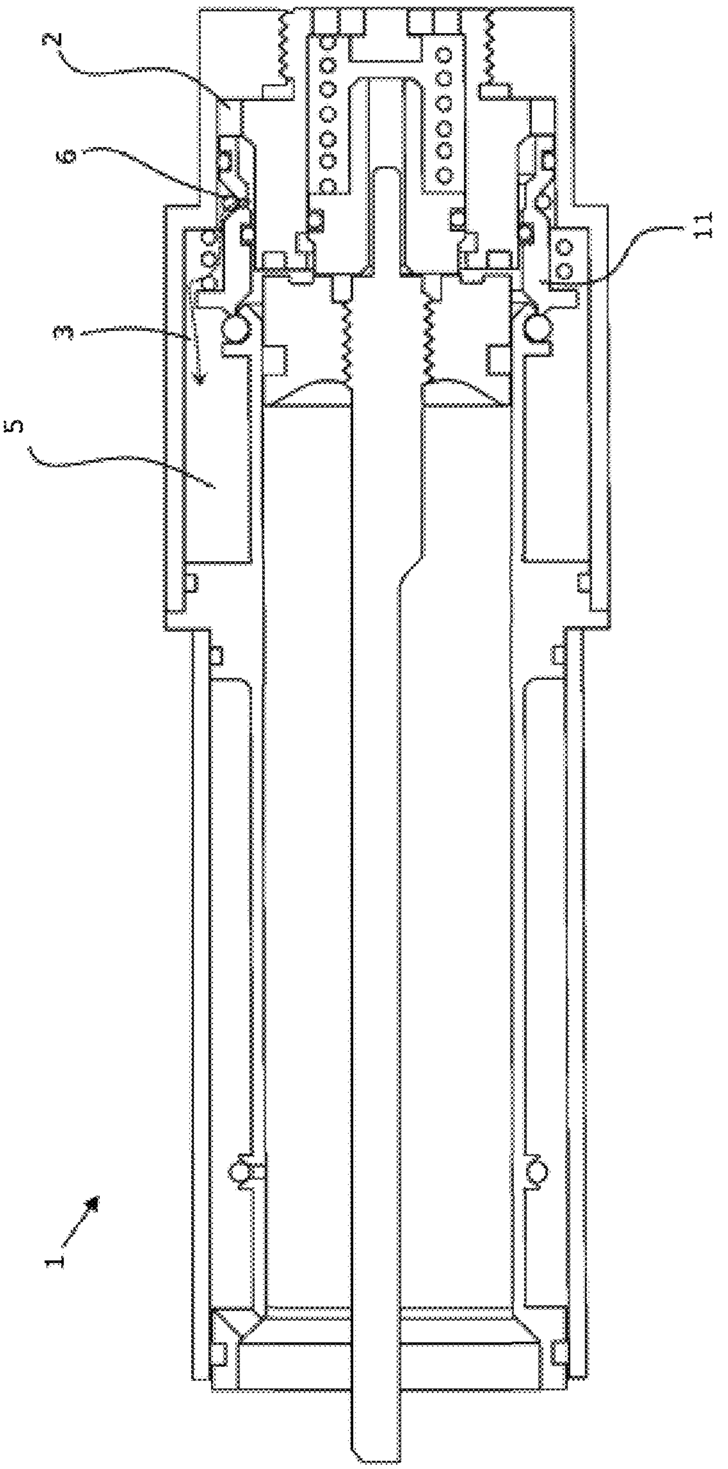

Downstream from the dump chamber 2 is a dose chamber 5. The two are separated by a dose valve member 11. The dose chamber 5 is also an annular ring chamber, which could also be described as a hollow cylindrical volume or void. Between the two is the dose valve member 11, described shortly. Between the dump chamber 2 and the dose chamber 5 is a flow path 6. The flow path 6 may be through the dose valve member 11 body, or may flow through a separate flow path to dose chamber 5 for example through one or multiple ports in the walls of each of said chambers, fluidly connecting the chambers. When the dump chamber 2 fills with operating fluid 3, usually at high pressure, then so to can the dose chamber 5 fill via the flow path 6. In the preferred form the flow path 6 is provided at least in part by the dose valve member 11 as shown in FIG. 3. Alternatively, it may be provided by a leak path around the dose valve member 11. In one form the flow path 6 is open all the time between the dump chamber 2 and the dose chamber 5. However, in other forms it may only open when the dose valve member 11 is in the closed position sealing off the dose chamber 5.

In the preferred form there is a restriction 25 in the flow path 6 between the dump chamber 2 and the dose chamber 5. In other forms there may be a check or one way valve 26 between the dose chamber and dump chamber. In certain applications, this is unnecessary, but in high cycle rate applications, this will be very beneficial. For example when the dump chamber pressure is reduced, if there is no one way valve 26, then pressure may flow back from the dose chamber 5 to the dump chamber 2, and then potentially to atmosphere. A check valve may be formed by an o-ring in a groove on the periphery of the dose valve member 2, which sits over a single or series of holes in the groove. Air can flow out the holes by displacing the o-ring, but is prevented from moving back through the holes by the o-ring, for example from the dump chamber to the dose chamber. The check valve may be formed by any other means, such as a poppet valve or ball-check valve. In designs where the flow path 6 linking the dump chamber 2 and dose chamber 5 are not via the dose valve member 11, these alternative check valve options are likely to be more suitable.

Providing this check valve provides the advantages of, a.) fast filling of the dose chamber in applications where fast filling is of benefit, for instance in high cycle rate (<1 s cycle) applications like fastening tools, b.) not allowing dose chamber gasses to flow back through to the dump chamber and then to atmosphere upon triggering and dumping of the pressure in the dump chamber. This increases reliability of the actuation mechanism by maximizing the opening force bias and increases efficiency as less air is dumped to atmosphere.

c.) The check valve necessitates other safety functions in some applications (additional check valves mentioned below)

d.) Where no check valve is present, a flow restriction may be present through the dose valve member or separate flow path linking the dump and dose chambers, where the triggering exhaust flow capacity exceeds the flow capacity through the dump to dose flow path 6.

In the preferred form the dose chamber 5 is also a ring or annular chamber, which could also be described as a hollow cylindrical volume, similar to the dump chamber 2. In the preferred form as shown in FIG. 1 this is along from the dump chamber 2.

A safety feature is the ability to independently dump the pressure from the dose chamber 5, and possibly also the dump chamber 2. In this way, the valve and actuation system 1 can be put into a safe or non-operative mode. In the absence of any other lock out system of the dose valve member 11, then dumping the pressure from at least the dose chamber 5 will prevent firing of the dose valve member 11, and hence prevent firing of the working load 17.

In the preferred form, dumping the dose chamber 5 pressure will also dump the dump chamber 2 pressure as this is connected by the flow path, but is done sequentially, of the dose chamber first and then the dump chamber, or in any other controlled way where the pressure in the dose chamber cannot override that in the dump chamber and hence the dose valve member is kept closed and thus the device is unable to fire.

As an example, when the architecture of the present invention is employed in a nail gun, then dumping the dose chamber 5 pressure will disarm the nail gun and prevent its firing. There may be a further lockout that prevents high pressure fluid flow into the dump chamber 2 (and thus into the dose chamber), or at least into the dose chamber, even if the trigger is pulled, until such time as the operator is ready to use the tool again and reactivates the tool, thus closing any safety valve from the dose chamber 5, and allowing operating fluid to then enter the dump chamber 2 and thus then the dose chamber 5—the tool, or at least the device 1, is then ready to operate once again. Simply dumping the dump chamber 2 and not allowing further operating fluid to enter it also is an option, however this is not safe, as the dose chamber 5 is armed and will then fire the working chamber, 8 and any workload 17 in there. For this reason, the "Turn Off" or "Make Safe" function, must not dump pressure from the dump chamber 2, instead, it must at least dump or release from the dose chamber 5 only or first.

In the preferred form the central axis of the dump chamber 2, and the central axis of the dose chamber 5 are parallel with the major axis 18 of the device, and in the preferred form they are all concentric. However, in some forms whilst parallel, they may also be of set from one another.

To increase safety there may be unintended pressure loss safety check valves 29A and 29B, and this is a functionality that would be required in fastening applications.

The first of these is a catastrophic supply failure check valve 29A. In an extreme event where a large leakage flow path occurs upstream of the trigger this could lead to the dump chamber 2 loosing pressure. An in-line check valve where the supply enters the dump chamber 2 from the dump chamber stops the dump chamber 2 from dumping back through the leak and triggering a fire event. Depending on the housing type and integrity of the system, and the flow capacity of other components, it may be decided that this safety function is not necessary, though that would have to be a very well-considered decision.

The second of these is a slow leak safety check valve 29B. Where an unintended slow leak, or normal pressure loss via pressure supply venting occurs the dose chamber 5 must not be allowed to be at significantly higher pressure than the dump chamber 2, as this would result in a fire event. A check valve upstream of the catastrophic supply failure check valve achieves this. As the supply pressure drops below the dose chamber pressure, air flows from the dose chamber and out the leak safety check valve, and eventually out of the failure leak point to atmosphere.

The trigger mechanism could utilise a spool valve that will dump the pressure in the dump chamber 2. Alternatively a spool valve could be used that interrupts the flow of operating fluid 3 to the dump chamber 2, and connects the dump chamber 2 to an exhaust to atmospheric. The spool valve may then revert to the first state where it closes the exhaust and reconnects the supply to the dump chamber 2. This would have the effect of supplying high pressure fluid to charge the dump chamber and dose chamber, in a first position, and then when moved to a second position cuts off supply of high pressure fluid completely, and then connects the dump chamber to atmospheric or reference or lower pressure. This then allows the dump chamber to release its pressure, and thus the dose chamber to open the dose valve, and charge the working chamber or work load 31 to then do work.

Figure 2:
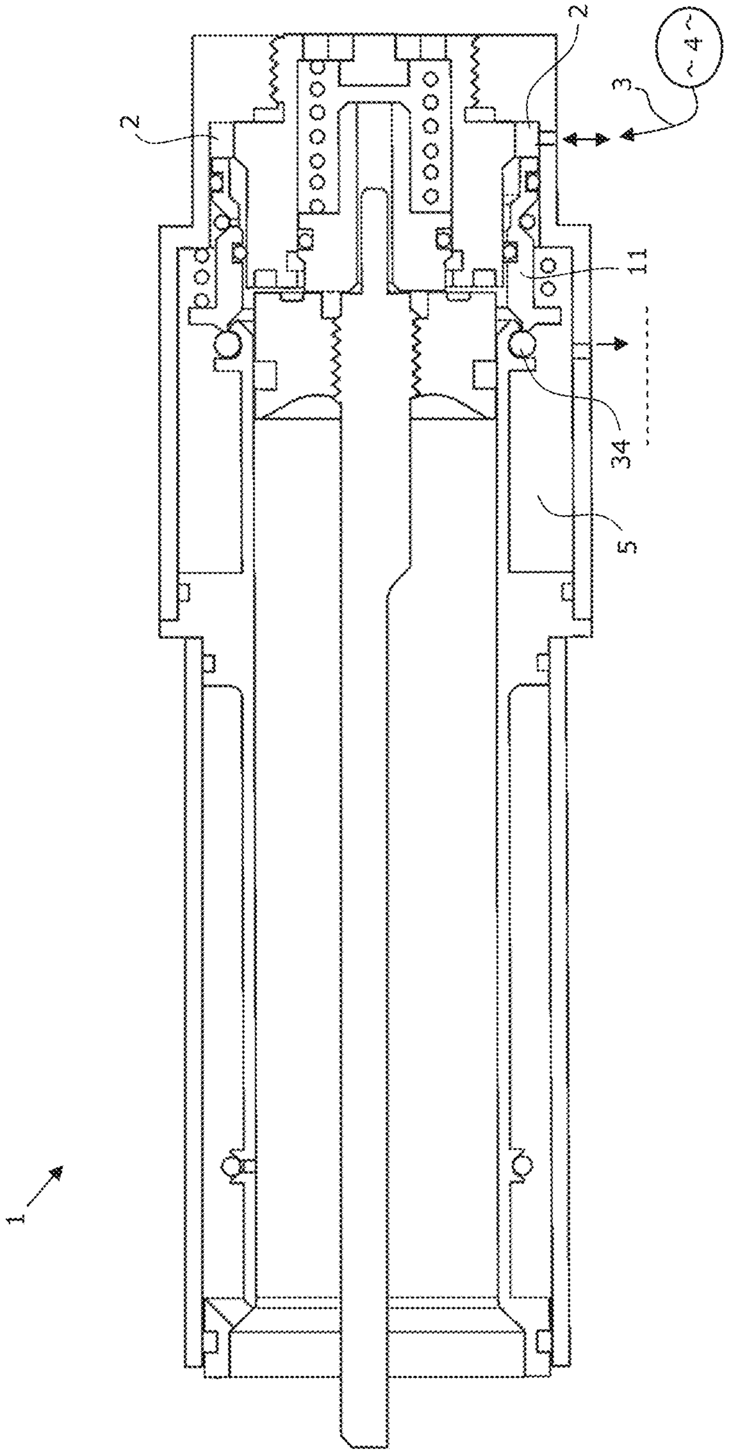
Figure 7:
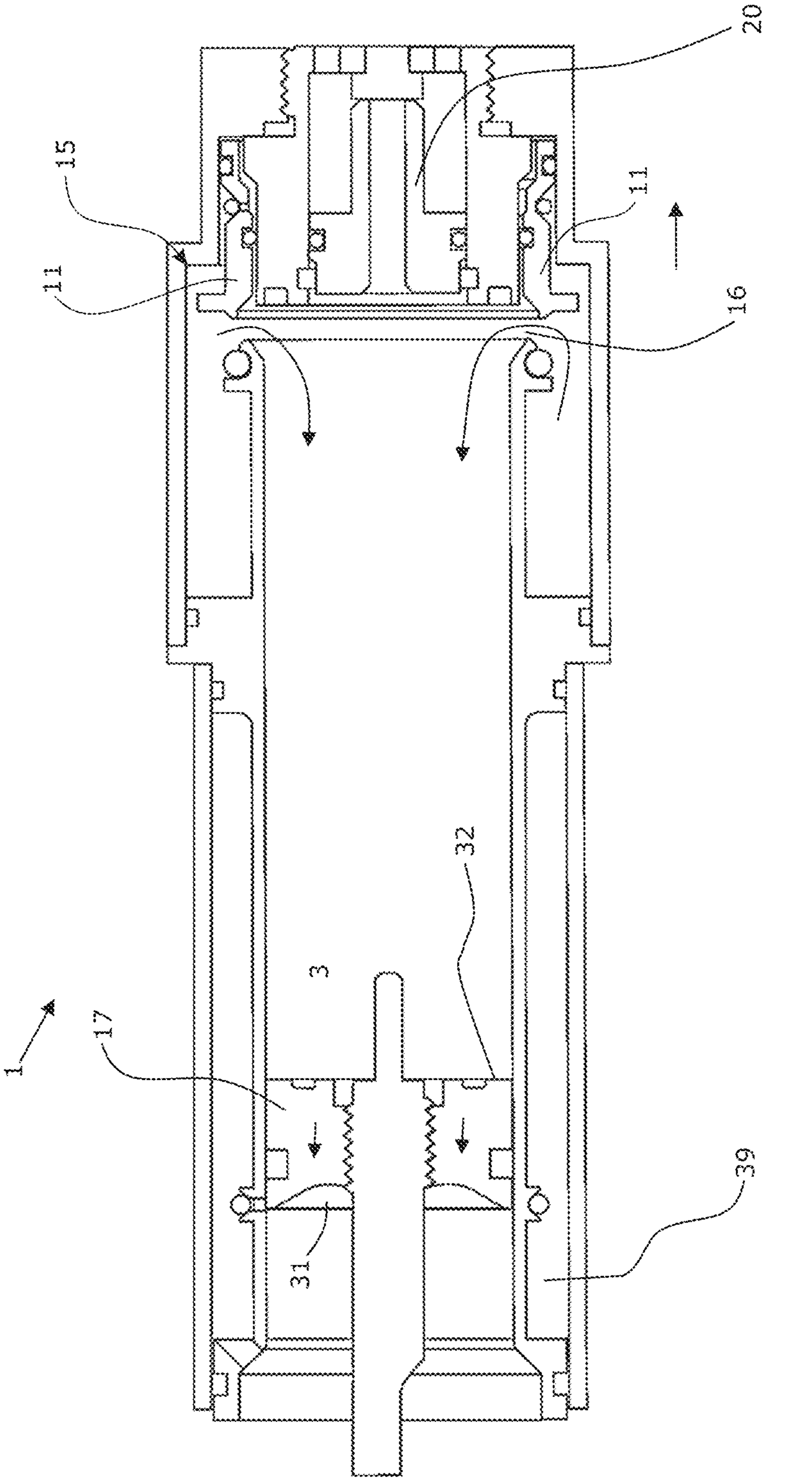

Between the dump chamber 2 and the dose chamber 5 there is the dose valve member 11. The dose valve member 11 has a closed position 13 as shown in FIG. 2 and an open position 15 as shown in FIG. 7. In one form the dose valve member 11 is biased closed. The dose valve member 11 has an annular sealing surface 12, which in the preferred form is, or is substantially, a blunt or rounded knife edge, as shown. This annular sealing surface 12 in turn, in the closed position 13, seals on a sealing member 34 via annular seat 14. In the preferred form the sealing member 34 is an O-ring, square section ring, X (or "quad") ring, or integrated co-moulded sealing element, or similar cross section rubber or rubber like materials as shown, though other forms are acceptable as long as they can seal as necessary to the sealing surface 12, the opposite arrangement could also be utilised as described below. The sealing member 34 is for example on a wall of the dose chamber or proximal thereto, as shown in FIG. 2. Alternatively, the sealing member 34 may be on the dose valve member 11, and the sealing surface 12 may be on the wall of the dose chamber, or proximal thereto.

Figure 6:
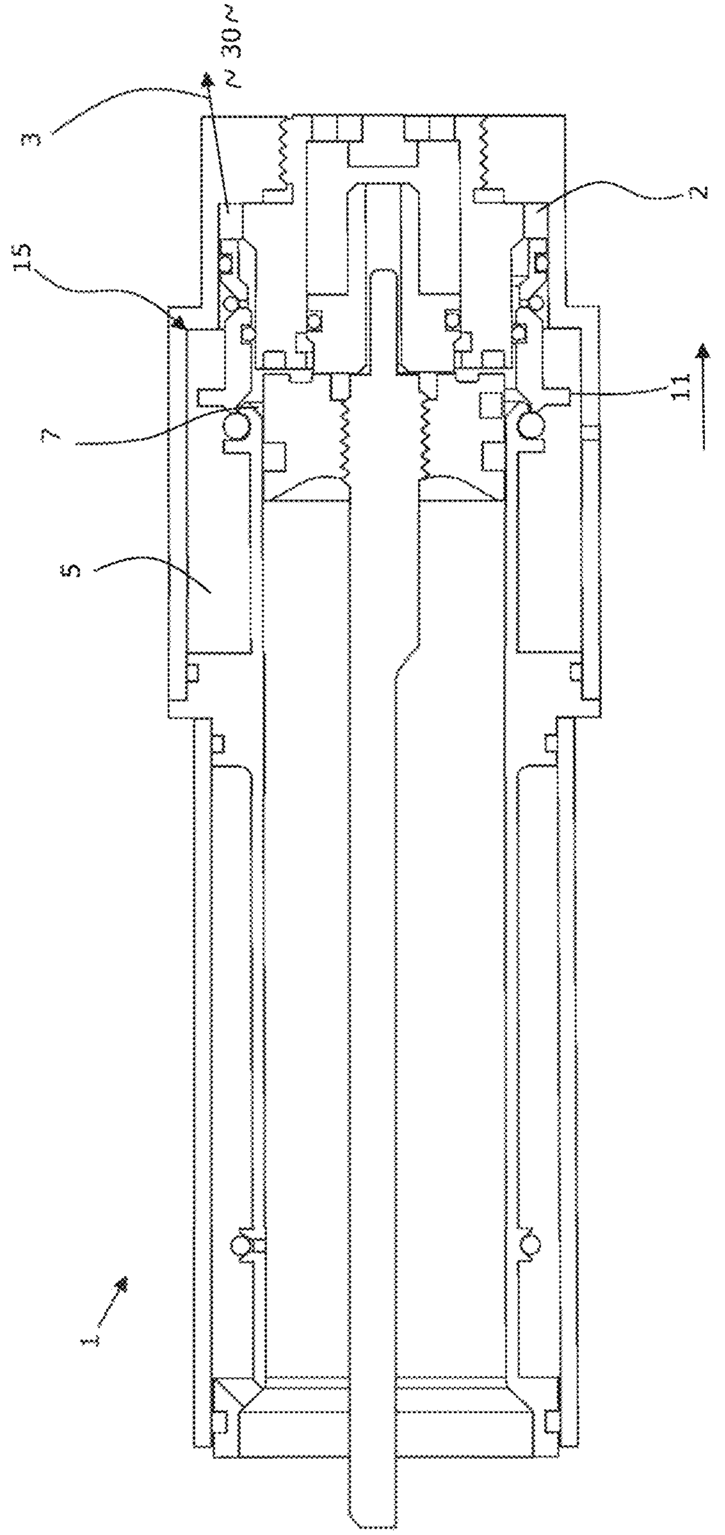

When the dose valve member is in the open position 15, as shown in FIGS. 6 and 7 then a gap 16 is presented or created, or formed between the annular sealing surface 12 and the sealing member 34. This forms an outlet 7 from the dose chamber 5 to the working chamber 8. This allows the operating fluid under pressure to enter the working chamber 8.

In the preferred form the dose valve member 11 is biased closed, for example by a dose spring 35.

The dose valve member 11 as shown has an elongate skirt 23 extending along and parallel to its linear axis 18. This elongate skirt 23 is received into the dump chamber 2 when in the open position 15. In the preferred form the elongate skirt 23 fills the entire dump chamber 2. When in the closed position 13, the elongate skirt forms in part a wall of an annular void which is the dump chamber 2. The fluid pressure in the dump chamber acts on the back surface(s) 36 of the dose valve member 11 to in part hold it closed. This fluid pressure therefore acts to further force the dump valve member 11 into the closed position 13, increasing the sealing between the annular sealing surface 12 and the sealing member 34. This is in conjunction with, or instead of, the dose spring 35.

The front surface(s) 37 of the dose valve member 11 are also subject to pressure from the operating fluid 3 in the dose chamber. However, the dose valve member is held in the closed position by the pressure and or area differential from the dump chamber. It is only when this pressure in the dump chamber is reduced that the dose valve member 11 then opens. Due to the high pressures this opening is very fast and happens within 0.01 to 2 seconds, and preferably less than 0.5 of a second.

In a steady state situation the pressures between the dose chamber 5 and the dump chamber 2 will be substantially the same, and typically for most fast firing situations they will be also. However, the dump chamber 2 has a greater area on the back surface 36 for the pressure to act on, than the front side presented to the dose chamber 5, thus the dose valve member 11 remains closed. It is only when pressure in the dump chamber 2 is reduced, dumped, vented or released, for example by a trigger system such as earlier described, will the dose chamber 5 have sufficient force to open the dose valve member 11.

Downstream from the dose chamber 5 and its outlet 7 is the working chamber 8. This has an inlet 9 at an inlet end 10 which receives the working fluid 3 from the dose chamber 5 as the dose valve member 11 moves to the open position 15.

The working chamber 8 contains a work load 17. This may be a captive workload, such as, but not limited to a piston which reciprocates within the piston, or may be a non-captive work load, such as a projectile or similar that is ejected from the working chamber 8. Alternatively, there may not be any physical item, such as a piston or projectile, in the working chamber, it may be a pressure wave then is released into, and or from the chamber to do work.

In the preferred form the workload, is located at the inlet end 10 with preferably no void or volume present behind it prior to opening of the dose valve member 11.

Present also downstream from the dose chamber 5 and dose valve member 11 is an exhaust valve 20. This could be upstream of the working chamber 8, or maybe in the same stream location as the working chamber 8 that is the working fluid 3 will operate on both at the same or similar time.

The exhaust valve 20 also has an open position as shown in FIG. 3 and a closed position as shown in FIG. 7. When in the open position it exposes one or more exhaust ports 21, and when closed it closes these. In the preferred form the exhaust valve 20 is biased to the open position, for example by an exhaust spring 38, or in addition or instead, a tensile member 28 as described below.

The exhaust valve 20 moves to the closed position by the operating fluid 3 as the dose valve member 11 opens, to thus close the exhaust ports 21 to provide a closed volume for the working chamber 8.

When the working chamber 8 is exposed to this pressurised operating fluid 3 then the workload there in receives the energy from the operating fluid and is acted on, for example it moves to the opposing end 22 of the working chamber 8. It may then be expelled therefrom, for example as a projectile, or it may then return for example when a piston.

As described above one method to return the work load to the firing position, that is near the dose valve end or inlet end, is to use an air cushion on the front side 31 of the workload, for example on the front side 31 of the piston. This is formed by the return chamber 39. A spring or similar could be used on the back side also.

Another method, in an alternative, or in addition to, is to use a tensile member 28 on the back side 32 of the workload, for example the piston, as shown in FIG. 11A-C. The tensile member 28 could for example be a resilient elastic element, such as, but not limited to, a silicone rubber, or similar material, that in its relaxed or near relaxed state holds the workload close to, or against the inlet end, of the working chamber.

When the actuation system 1 is fired, and the workload moves down the working chamber 8 the tensile element 28 extends. When the firing stroke is complete, the workload needs to return to the valve end or inlet end 10 of the working chamber 8, and the pressure on the working side or back side of the work load is reduced. The tensile member itself, or in conjunction with an air cushion or other stored energy on the front side 31 of the workload, will then want to contract again. In this way it will pull the work load back towards the inlet end 10 of the working chamber 8 while the air cushion pushes it.

The tensile member 28 may be connected to an interior of the working chamber 8 or may extend through a wall of the working chamber and be connected or restrained by an exterior surface, body, securing, or fastening method.

In other forms the tensile member may be connected to the exhaust valve 20 for example the seat, piston or moving element, as shown in FIG. 11A-C. The exhaust valve 20, on firing, will, as described above, close off the exhaust port 21 as the work load travels down the working chamber 8. On, or near, completion of the working stroke, the exhaust valve 20 is timed to open the exhaust port(s) 21 to reduce the pressure on the front of the work load to thus ease its return to the starting position at the inlet end 10 of the working chamber 8.

When the tensile member 28 is connected to the exhaust valve 20, the tensile member 28 is tuned such that it will help, at least in part, or in full, to control the movement of the exhaust valve 20 and open the exhaust port(s) 21. This is an additional way to tune and time the exhaust port 21 opening by way of imparting force on an exhaust element based on the position of the work load. This may provide an advantage as it can be used to remove the piston return chamber 39 altogether (thus reducing part counts, potential for seal failures, and or complexity), or remove some of its components, for example the one way check valve, or at least allows a reduction in the piston return chamber 39 size or will allow the piston return chamber to be operated effectively at lower pressure.

In addition, if the tensile member 28 is an elastic material, at least for the extension it will experience, then typically it will reduce in cross sectional area as it extends and expand in cross sectional area as it expands. This is clearly shown in FIGS. 11A-C.

Figure 11:
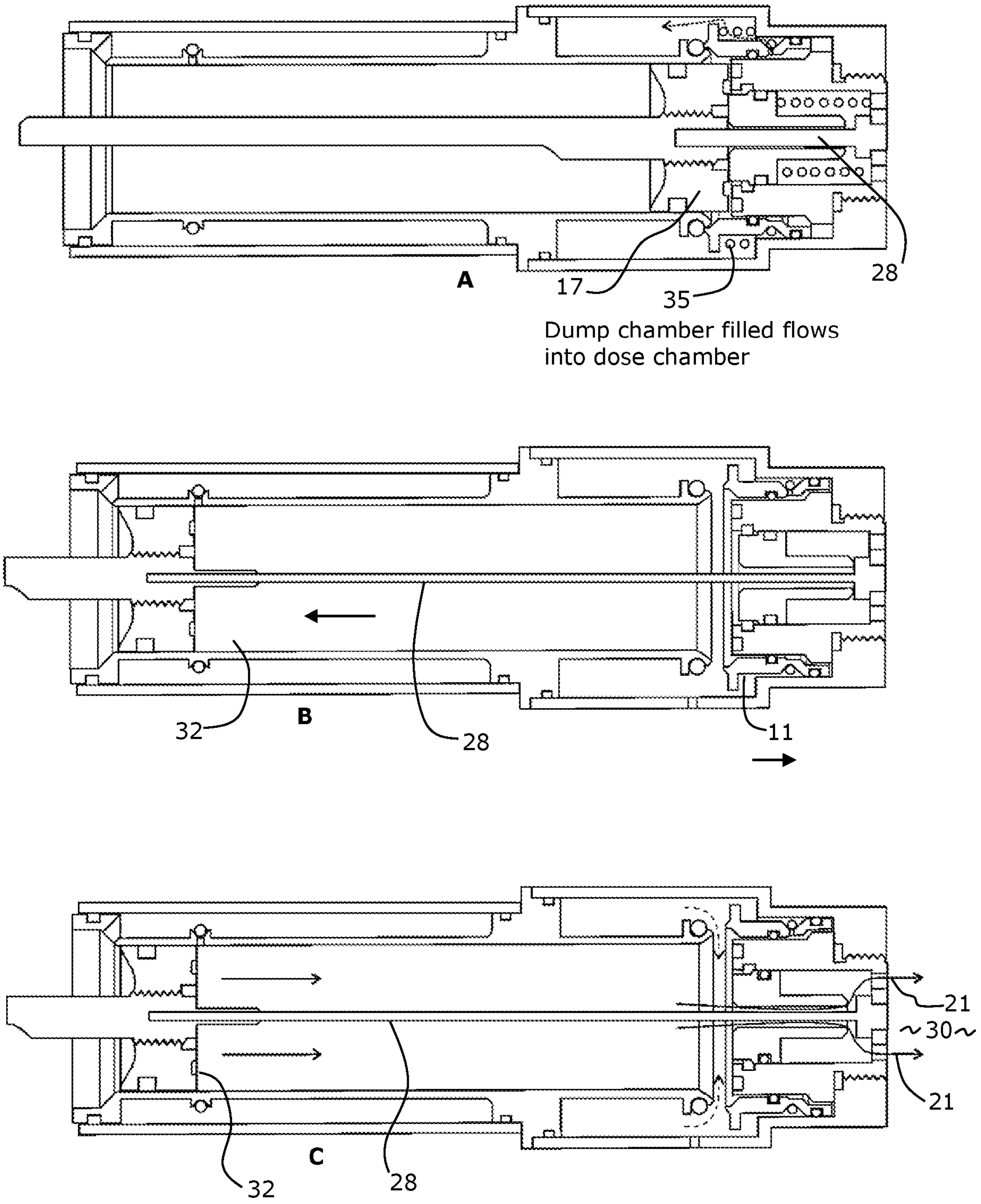
Figure 12:
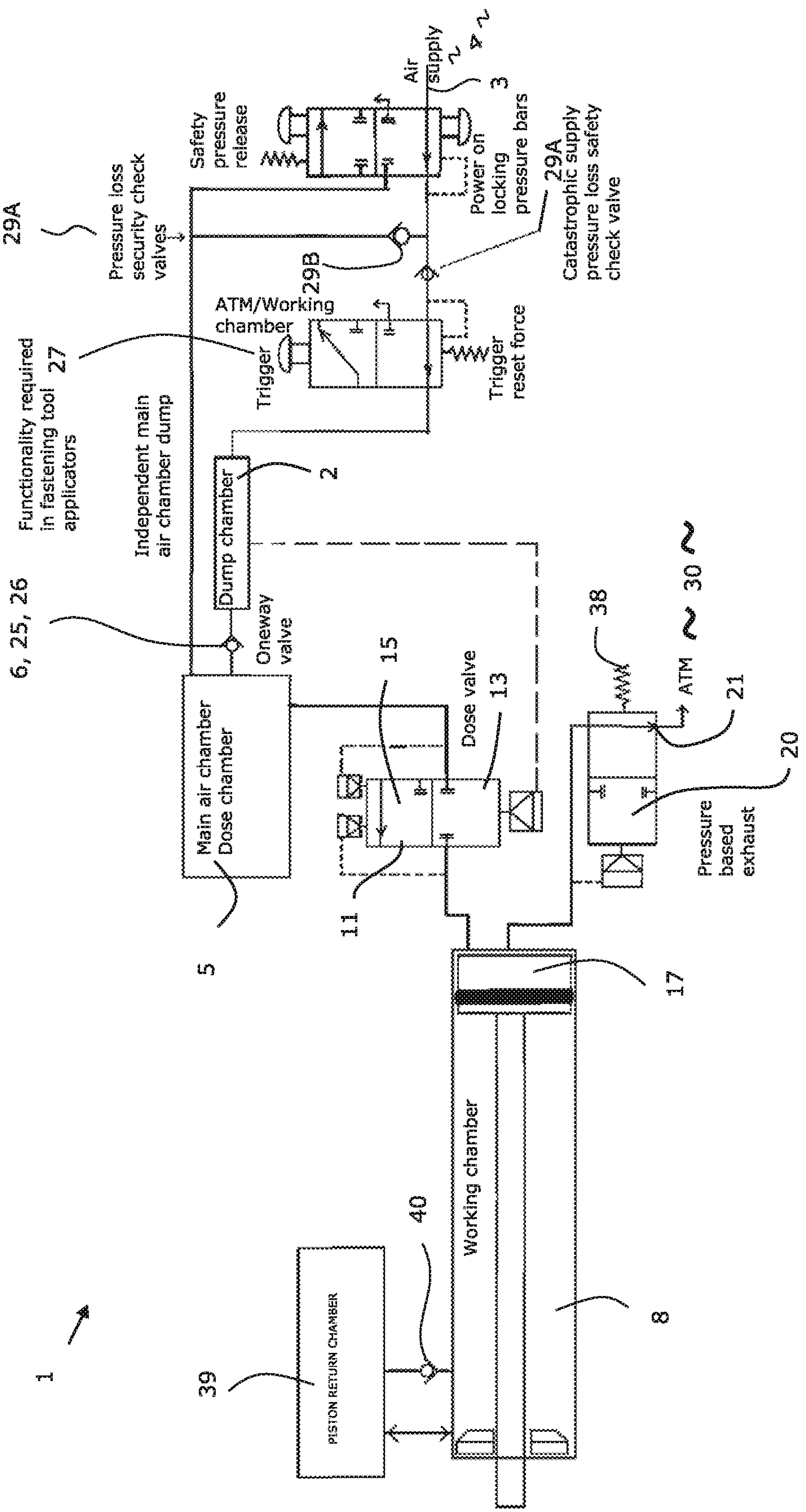

The tensile member 28 as shown in FIG. 11 may be connected through, at least in part, the exhaust valve 20. Thus when the tensile member 28 extends it will reduce its cross sectional area, visible in FIG. 11B, and open that portion of the exhaust valve 20 that it is connected through, typically when the workload is at the extreme of its stroke and so the work has been done by the high pressure fluid, and the workload is ready to return. The exhaust valve 20, will then open under the actions described above, and optionally also due to the pull, and thinning from the tensile member 20, and will move to the open position, free of the ports 21. The thinning of the tensile member 28 then allows a further evacuation path through the body, in this case the centre, of the exhaust valve 20.

This feature can be further used to time the opening of the exhaust valve 20, and exhaust ports 21. In this way it can reduce the linear motion needed for the exhaust valve 20 to open and close the ports 21.

The device is contained, at least in part, and which forms some of the structures described by a housing 33. The device has a major axis 18 running its major length.

The method of operation of the valve and actuation system in keeping with the present invention is now described with reference to FIG. 1 through 10. Directions of movement of valves, workload, and operating fluid 3 is shown by arrows, and locations of operating fluid is clarified with cross hatched lines.

Figure 4:
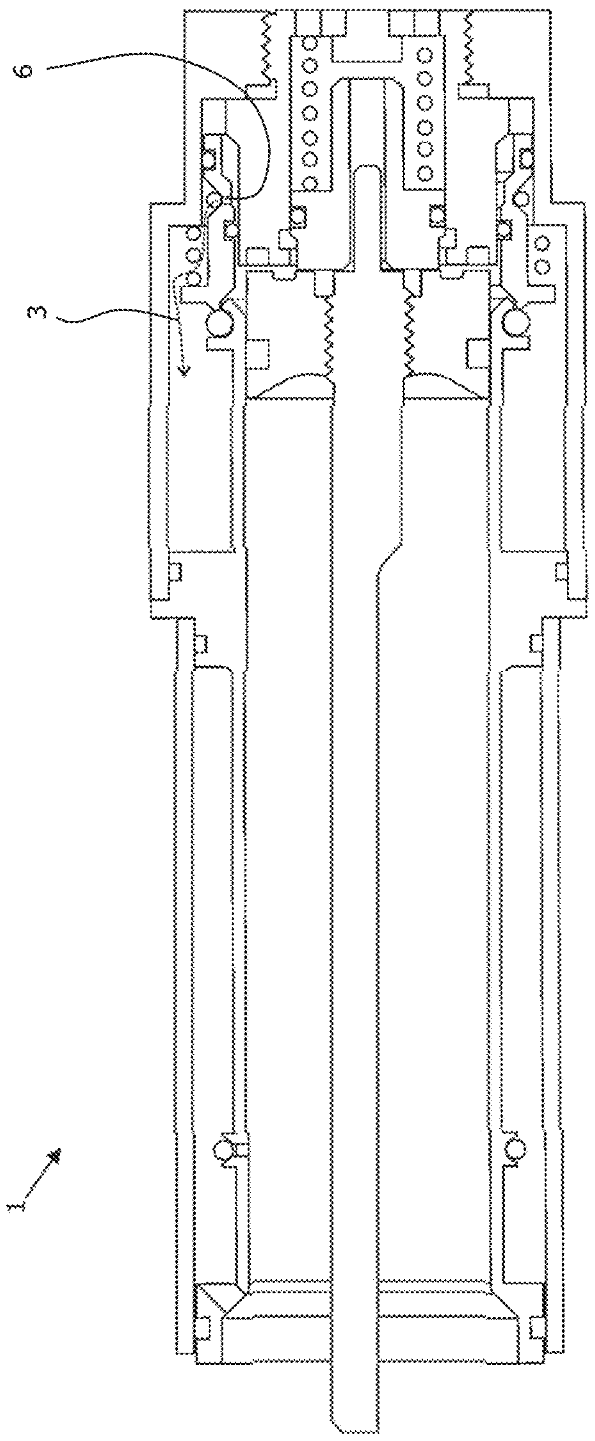

In FIG. 3 the dump chamber 2 fills faster than the dose chamber 5, creating or adding to dose valve member 11 closing and sealing force bias. This fill speed differential is unavoidable due to the dose chamber 5 being supplied by the dump chamber 2, via the flow path 6, and any restriction 25 of valve 26 in that flow path, the amount of pressure differential produced is dependent on the flow capacities of the flow paths into and out of the dump chamber 2. The dose chamber 5 may also be filled through a one way valve. In FIG. 4 the dose chamber 5 is shown charged.

Figure 5:
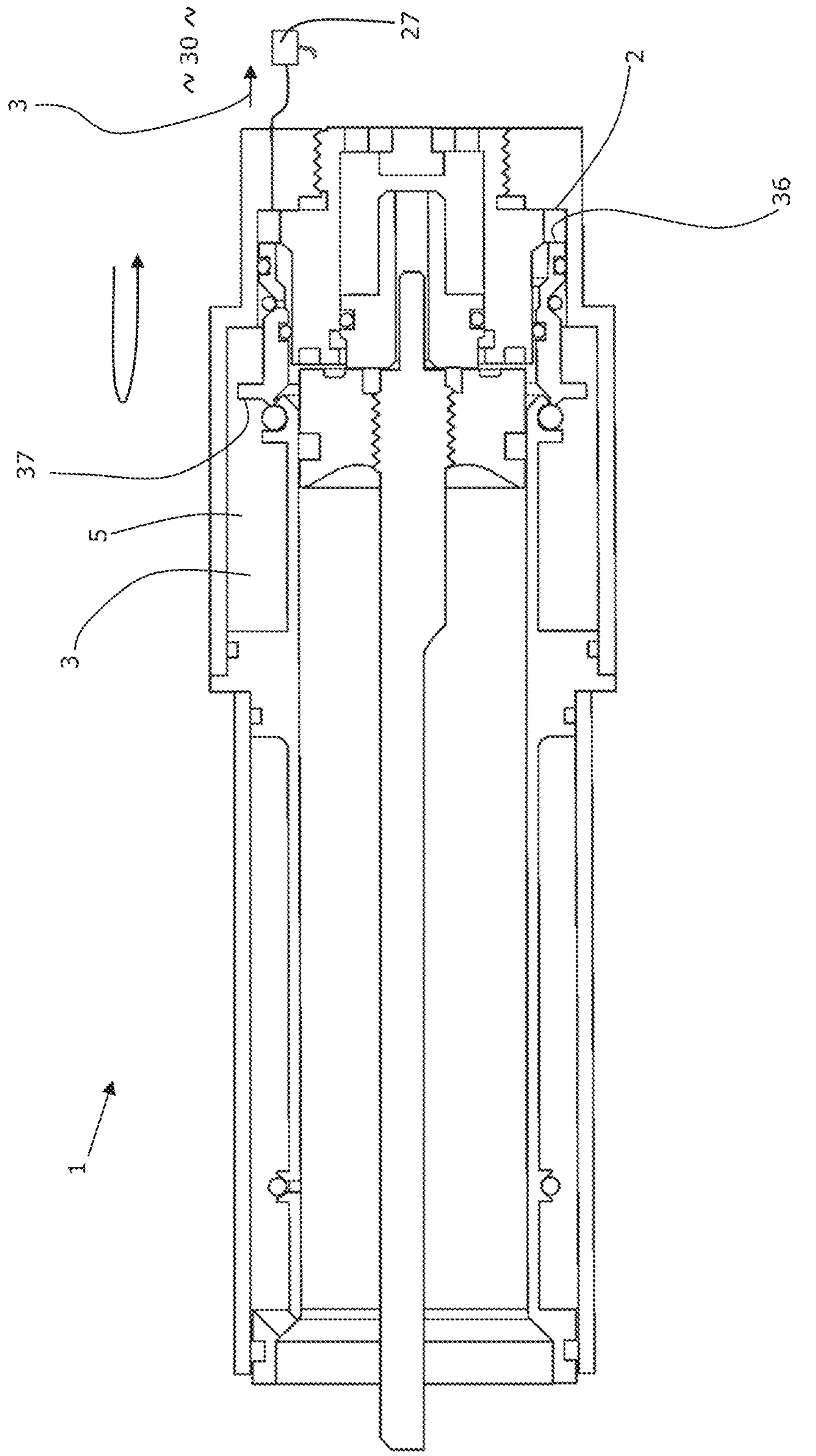

In FIG. 5 the dump chamber 2 is exhausted or released, in this case to a lower pressure, for example atmosphere or reference pressure, when the trigger mechanism 27 is actuated. The force balance on the dose valve member 11 is swapped due to the pressure areas of the inner, outer and face seals. In other forms the dump chamber may exhaust to the working chamber 8 (will slightly increase efficiency, and will partially mitigate the need to make the dose chamber 5 extremely small for efficiency)

The dose valve 5 then opens in FIG. 6, pressurised gas flows to fill the small space behind the workload 17, in this case as shown, a piston. This a. Increases the opening force bias on the dose valve member 11 further, opening it fully & pushing out any remaining gas in the dump chamber 2.
b. Begins to energize the exhaust valve, starting to move it towards it's closed position.
c. Starts to move the workload down the working chamber.

The operating fluid 3 in the dose chamber 5 expands, shown in FIG. 7, dropping in pressure and pushing the workload 17 down the working chamber 8. The exhaust valve 20, which as shown is piston shaped, is sealed against it's face seal to seal the exhaust ports 21, and thus the working chamber behind the work load.

Figure 8:
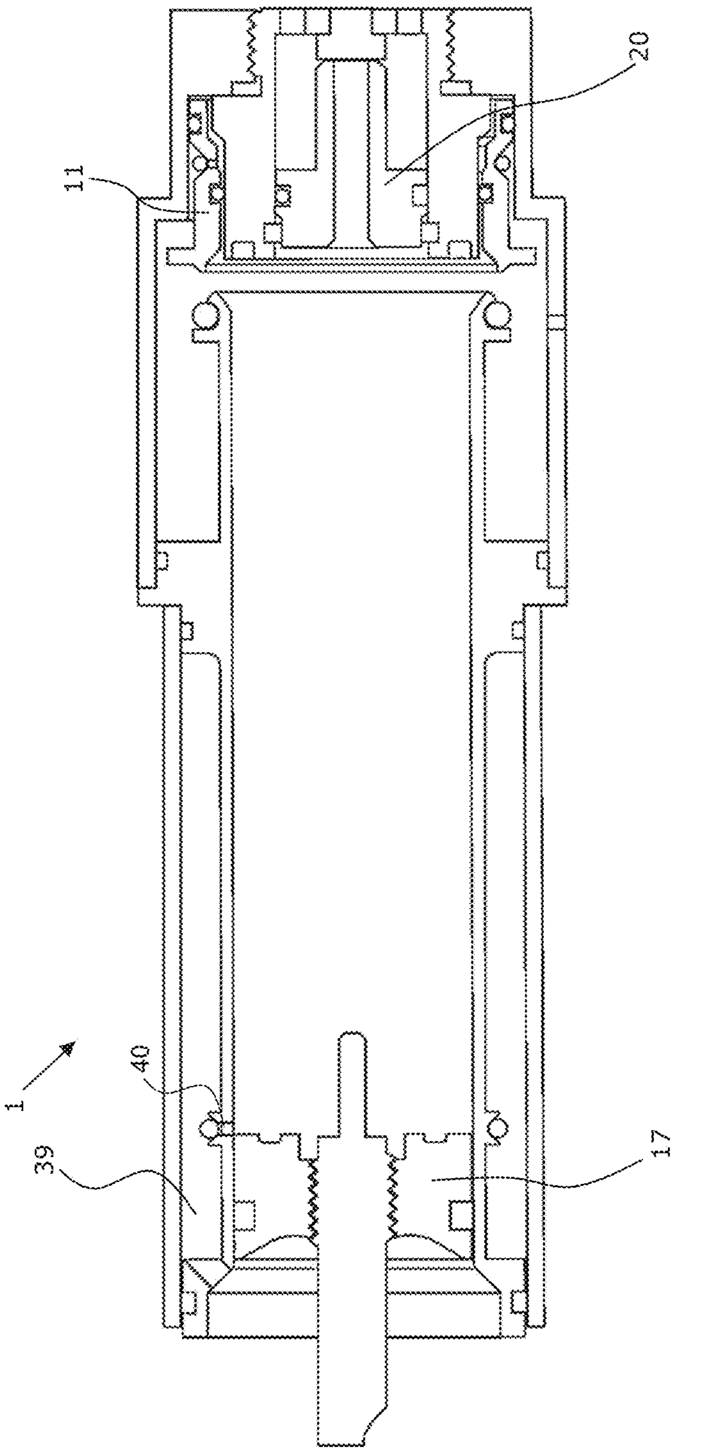

The workload, in this case a piston, as it moves, passes the return chamber one way valve 40 in FIG. 8, allowing working chamber pressure on the front side 31 of the work load to expand into the piston return chamber 39. If the dose valve member 11 is fitted with a force bias spring 35 (not shown), it will close the dose valve member 11 now, slightly before, or slightly after depending on tuning.

Figure 9:
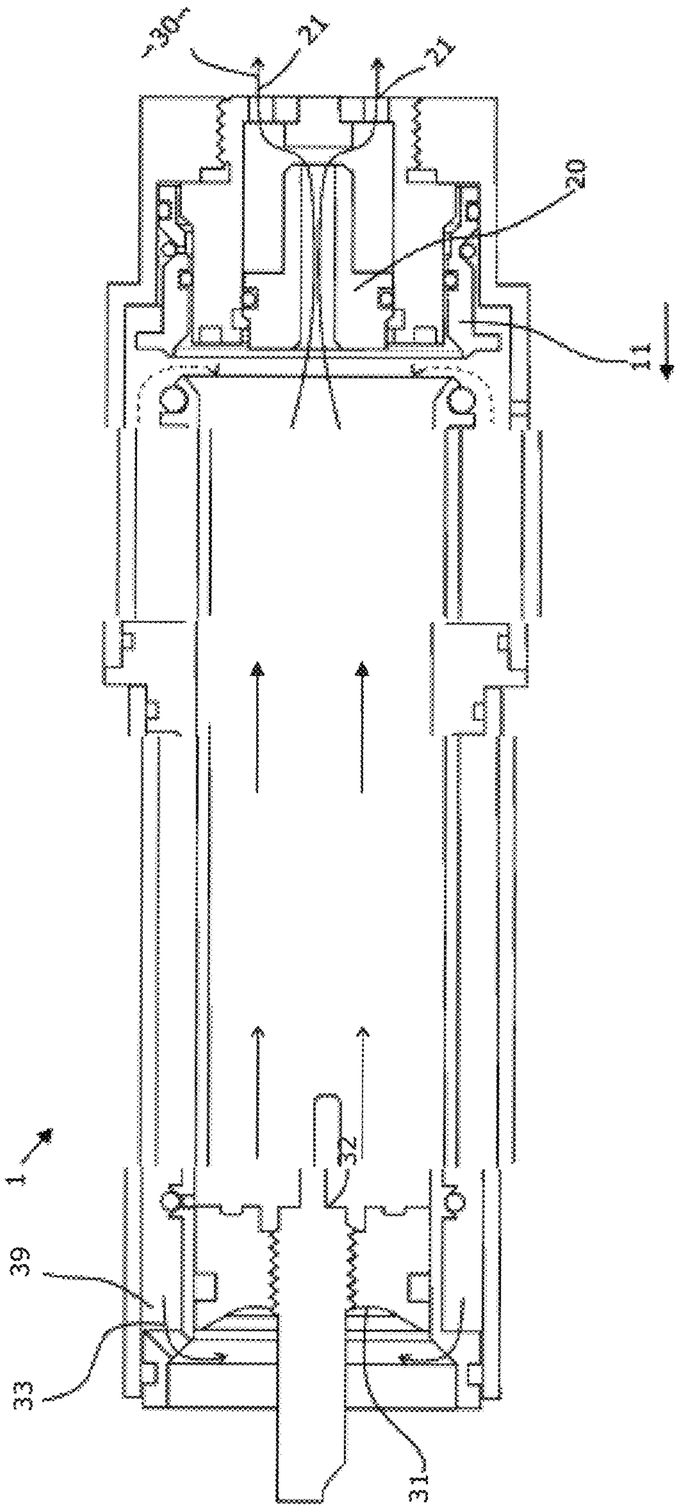

The exhausting pressure is reached as shown in FIG. 9, allowing the exhaust spring 38 to overcome the pressure force to open the exhaust valve 20, and thus the exhaust ports 21. This allows for workload return, or loading, driven by operating fluid 3 in the piston return chamber 39, and or tensile member 28. If a dose spring 35 is included, the dose valve member 11 moves to the closed position 13 at this stage—but if it is absent, the dose valve member 11 will sit open, and dose chamber 5 will be fully exhausted to the working chamber, and subsequently to atmosphere after the exhaust is opened.

Figure 10:
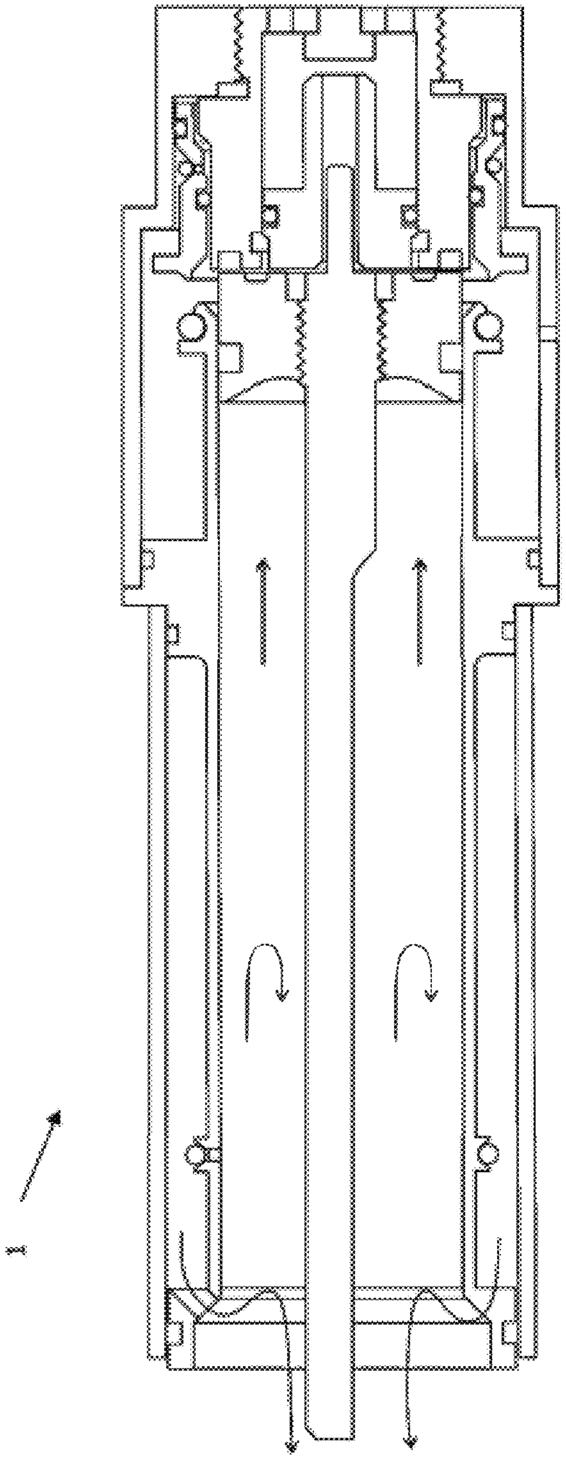

The remaining operating fluid 3 behind the workload 17 is exhausted to atmosphere through the ports 21 and the workload 17 returns as shown in FIG. 10 to the inlet end 10.

On pulling or otherwise activating the trigger the supply of operating fluid to the firing mechanism, that is to the dump chamber 2, is shut off. Then on release of the trigger mechanism 27, the dump 2 and dose 5 chambers are quickly recharged. In other forms activating the trigger mechanism 27 will shut off supply momentarily, but will then refill the dump chamber 2, even if the trigger mechanism is not released.

The trigger 27 release may be automated, latched, or sprung in some manner to allow refilling while the trigger is still depressed, that is to say the trigger is only effective for a short time, or dependent on another triggering element such a safety element used in nail guns which ensures the tool is held against the work piece as part of the triggering action.

Exhausting may also occur independent of the position of the dose valve member 11

The present invention may have potential applications in penetrative fastening tools, pneumatic motors, projectile launchers, fast pulse air or fluid valves, and the like. The operating fluid may be a compressed gas, and preferably highly compressed, using 4500 PSI or higher as a source, though this may be regulated down, for example air, carbon dioxide, nitrogen or similar. In alternative forms the operating fluid may be a hydraulic fluid, a supercritical fluid or similar.

The present invention offers a number of advantages over the prior art:

- The valving is very efficient and a high percentage of the available energy can be extracted from the high pressure fluid. This allows a greater number of repetitions to be obtained from the high pressure fluid source, decreasing the costs associated with replenishing the source and increasing the convenience of using the motion transfer device.
- Due to the contained nature of the system and the large reduction in fludi pressure from the start of the cycle to the end, the noise pollution created by the device is substantially reduced and increases its usability.
- The smaller amount of pressurised fluid required per cycle allows a greater number of repetitions to be safely achieved.
- The smaller volume of pressurised fluid expelled during the exhaust of the actuation system reduces the exhaust requirements and potential safety hazards associated with this process. For example, where the pressurised fluid is carbon dioxide the risk of dry ice forming in the exhaust is reduced.
- The opening area of the valve is large relative to the volume of the dose chamber, and the valve area opens rapidly. Accordingly, a full charge of high pressure gas exits the dose chamber very quickly and the valve can return closed very soon after opening. This allows the mechanism to operate effectively at a very high cycle rate, and the dose chamber and dump chamber can be charged and ready to fire again even while the workload is moving down the chamber.
- Allows for High power density, and extremely highly efficient pneumatic force actuation using reliable pressure dump, force bias sealing and triggering.

The foregoing description of the invention includes preferred forms thereof. Modifications may be made thereto without departing from the scope of the invention.

The invention claimed is:

1. A device, comprising:

a dump chamber that is annular in shape, configured to receive high pressure fluid from a high pressure fluid source;

a dose chamber configured to receive a flow of the high pressure fluid from the dump chamber via a flow path from the dump chamber to the dose chamber, the dose chamber having an outlet;

a working chamber having an inlet at an inlet end thereof; and a dose valve member with an annular sealing surface surrounding the inlet end;

wherein, with the dose valve member in a closed condition, the sealing surface meets with an annular seat to seal the outlet; and, with the dose valve member in an open condition, a gap is presented between the annular sealing surface and the seat to allow high pressure fluid to move from the outlet to the inlet, and flow of the high pressure fluid is prevented from entering the dose chamber or the dump chamber;

wherein the high pressure fluid in the dump chamber, at least in part, holds the dose valve member in the closed condition, until the high pressure fluid pressure in the dump chamber is reduced, whereby the high pressure fluid in the dose chamber unseats the dose valve member to the open position, and wherein there is a restriction in the flow path from the dump chamber to the dose chamber, such that the dump chamber will add to the closing pressure of the dose valve member even when filling the dose chamber.

2. The device as claimed in claim 1, wherein the high pressure fluid flowing into the working chamber then performs work on a workload therein to expel it from, or move it to or toward, an opposing end of the working chamber.

3. The device as claimed in claim 2, wherein, as the workload is driven from the inlet end to the opposing end, there is no fluid connection available from any high pressure fluid source to the workload driving assembly or chambers; or wherein the workload, whether captive or expelled is configured to slide linearly along the working chamber from the inlet end, to or towards the opposing, distal end, parallel to a major axis of the device.

4. The device as claimed in claim 1, wherein the dose valve member is configured to slide linearly; or wherein the dose valve member is configured to slide along a linear axis parallel to a major axis of the device.

5. The device as claimed in claim 1, wherein the dump chamber, the dose chamber, and the working chamber, lie concentric with, or parallel with, a major axis of the device.

6. The device as claimed in claim 1, wherein there is an exhaust valve that is biased open, at or toward the inlet end, and which is configured to close off an exhaust port under actuation from the high pressure fluid leaving the dose chamber.

7. The device as claimed in claim 6,
- wherein the exhaust port is configured to open when the workload is at or near the opposing end, under the action of the bias;
- wherein the exhaust valve is a piston or diaphragm which is at least partially encircled by the dose valve member;
- wherein the bias on the exhaust valve is a spring; or
- wherein the bias on the exhaust valve is a tensile member connected between the workload and the exhaust valve.

8. The device as claimed in claim 1, wherein the dose valve member is at least in part biased in the closed condition.

9. The device as claimed in claim 1, wherein the dose chamber is a hollow volume radially outward or inward from the working chamber.

10. The device as claimed in claim 1,
- wherein the flow path is via the dose valve member; or
- wherein the flow path is via the dose valve member, and the flow path is in a skirt of the dose valve member.

11. The device as claimed in claim 1, wherein there is a one way valve in the flow path from the dump chamber to the dose chamber.

12. The device as claimed in claim 1,
- wherein the pressure in the dump chamber is reduced by a trigger mechanism.

13. The device as claimed in claim 1, wherein the workload is returned to the inlet end by a fluid cushion on a back side thereof, a spring on a back side or front side, or a tensile member connected from a front side to or towards the inlet end.

14. The device as claimed in claim 1,
- wherein there is a safety valve configured to selectively dump pressure from the dose chamber to prevent operation of the device; or
- wherein there is a slow leak safety valve configured to release fluid pressure from the dose chamber should the high pressure fluid supply pressure drop below that of the dose chamber.

15. A method of operating a high pressure fluid device, comprising:
- filling a dump chamber that is annular in shape with a high pressure fluid;
- increasing a sealing pressure of a dose valve member by the high pressure fluid acting on a back side of the dose valve member, to hold the dose valve member in a closed condition, the dose valve member having an annular sealing surface between an outlet from a dose chamber, and an inlet to a working chamber at an inlet end of the working chamber;
- passing high pressure fluid from the dump chamber to the dose chamber via a flow path;
- reducing the pressure of the dump chamber such that the high pressure fluid in the dose chamber, acting on a front side of the dose valve member, forces the dose valve member to an open condition presenting a gap between the inlet and the outlet; and
- preventing flow of the high pressure fluid from entering the dose chamber or the dump chamber when the dose valve member is open;
- wherein the high pressure fluid enters the working chamber from the dose chamber to perform work on a workload within the working chamber, and wherein there is a restriction in the flow path from the dump chamber to the dose chamber, such that the dump chamber will add to the closing pressure of the dose valve member even when filling the dose chamber.

16. The method as claimed in claim 15, wherein an exhaust valve is moved to a position where it closes off an exhaust port from the working chamber, until the work is done on the workload, at which time the exhaust port opens.

17. The method as claimed in claim 16,
- wherein the method includes the step of allowing the workload to return to the inlet end of the working chamber, any fluid between the workload and the inlet end exiting through the exhaust port; and
- wherein the exhaust port is biased open, except for when the high pressure fluid exits the dose chamber such that the bias is overcome and the exhaust valve moves to the closing position of the exhaust port.

18. The method as claimed in claim 15,
- wherein the dose valve member moves to the closed position once the workload moves to or toward the opposing end;
- wherein a trigger mechanism reduces the pressure in the dump chamber;
- wherein the workload is returned to the inlet end by a bias;
- wherein the dump chamber and the dose chamber are free to fill again once the dose valve member is in a closed position;
- wherein the filling of the dump chamber aids in closing the dose valve member; or
- wherein the method includes the step of dumping the high pressure fluid in the dose chamber to atmosphere to prevent the device from operating.

19. The device as claimed in claim 1, further comprising: a check valve in the flow path from the dump chamber to the dose chamber, wherein the check valve is configured, in response to the device being triggered, to prevent flow of the high pressure fluid from the dose chamber to the dump chamber.

20. The device as claimed in claim 12 wherein the trigger mechanism is configured to dump the pressure in the dump chamber to atmosphere.

* * * * *